United States Patent [19]
Kemp

[11] 3,765,560
[45] Oct. 16, 1973

[54] SEALING APPARATUS

[76] Inventor: Norman H. Kemp, 2609 Manona Dr., Dallas, Tex. 75220

[22] Filed: Mar. 6, 1972

[21] Appl. No.: 232,107

Related U.S. Application Data

[63] Continuation-in-part of Ser. No. 000,022, Feb. 2, 1969, which is a continuation of Ser. No. 729,966, May 17, 1968, Pat. No. 3,498,493 and a continuation-in-part of Ser. No. 494,061, Pat. No. 3,387,738.

[52] U.S. Cl. ................... 220/46 R, 138/90, 166/118
[51] Int. Cl. ............................................ B65d 53/00
[58] Field of Search ........................... 220/46 R, 55; 138/90; 166/118

[56] References Cited
UNITED STATES PATENTS
3,647,108 3/1972 Kemp.................................. 220/46 R
3,498,493 3/1970 Kemp................................. 220/46 R Primary Examiner—George T. Hall
Attorney—Howard E. Moore et al.

[57] ABSTRACT

Sealing apparatus for pressure vessels including a resilient seal ring disposed in a receptacle secured to the vessel. The seal ring has an outer lip and an inwardly turned flange angularly disposed to the outer lip whereby pressure within the vessel is exerted through an opening in the seal ring to urge the seal ring into positive sealing relation with outer surfaces of the vessel around an opening in the vessel and with surfaces in the receptacle. The seal ring carries a seal member positionable through an opening in the vessel having surfaces urged by fluid pressure in the vessel into sealing engagement with surfaces inside the vessel.

17 Claims, 8 Drawing Figures

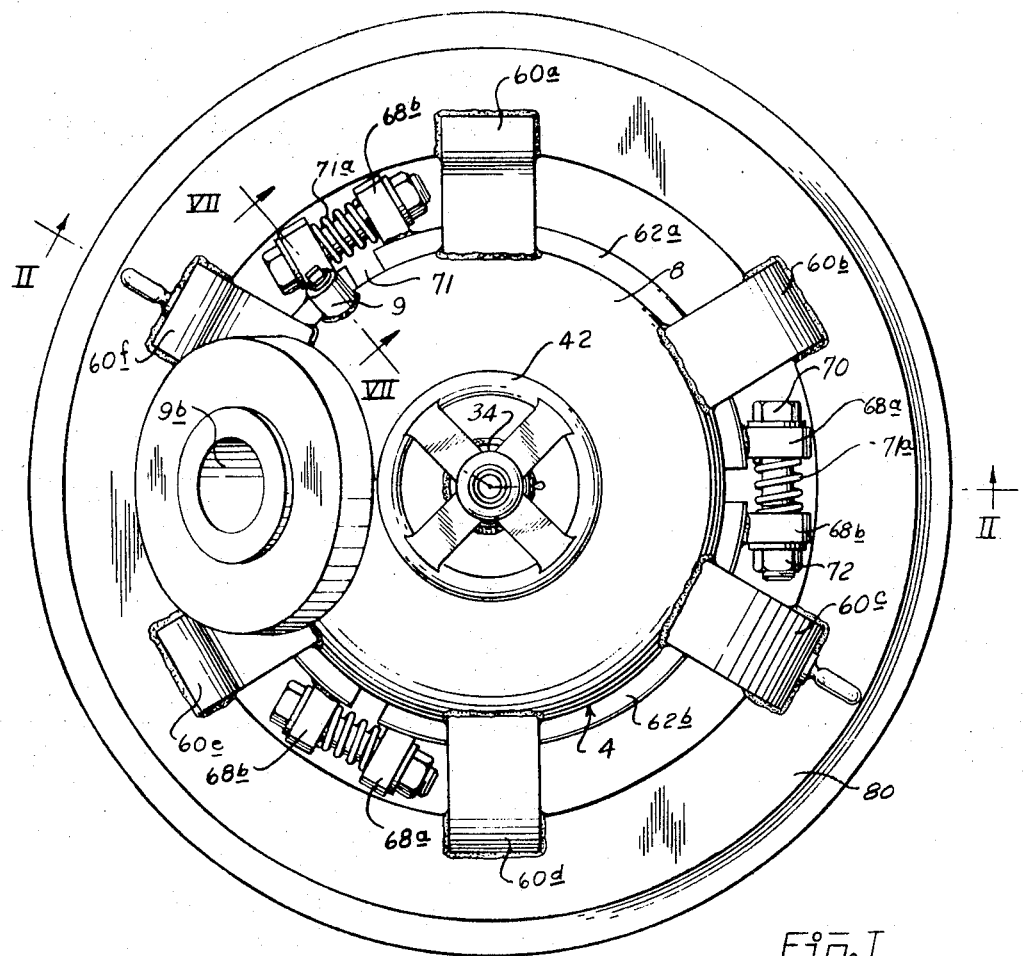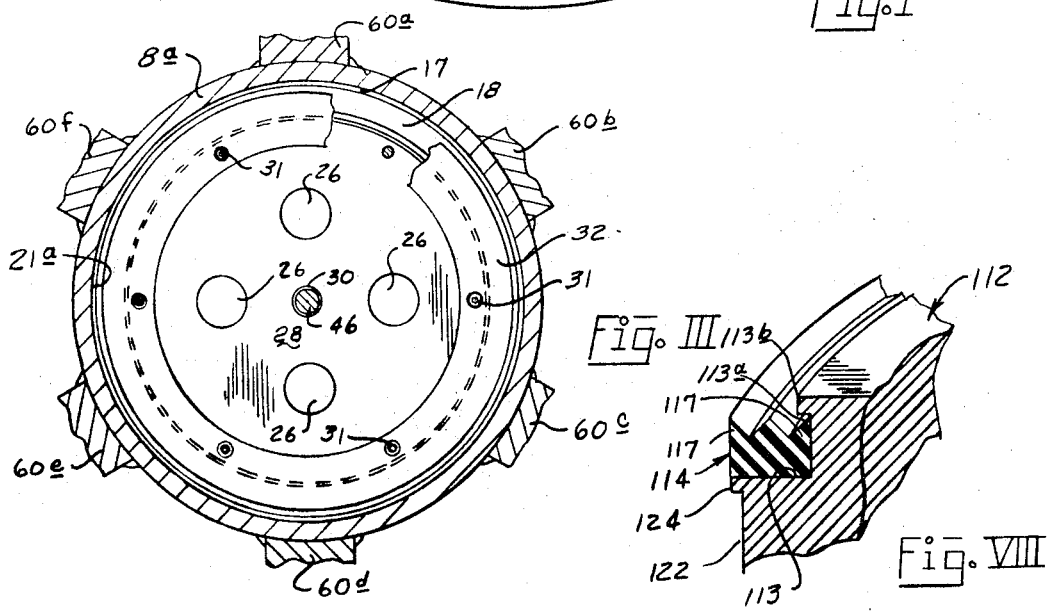

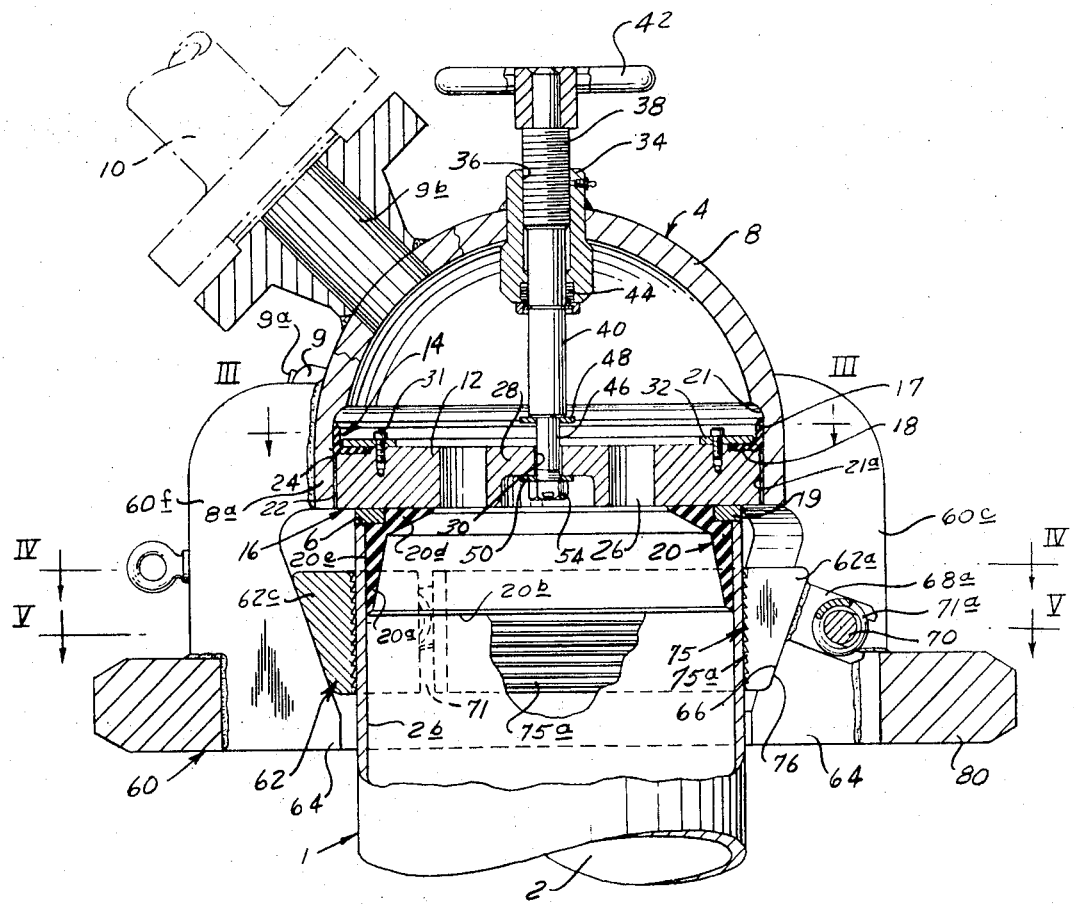
Fig. II
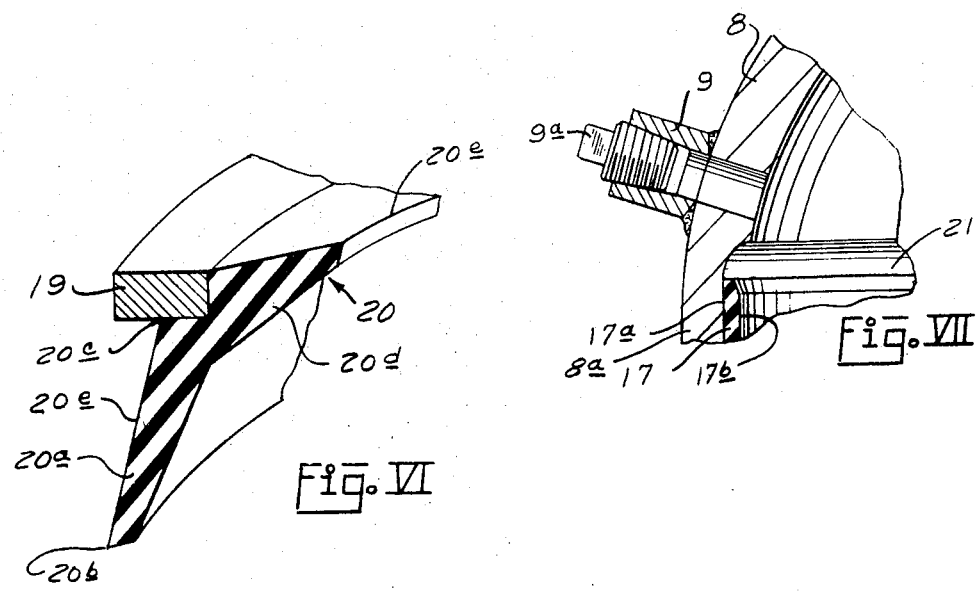
Fig. VI
Fig. VII

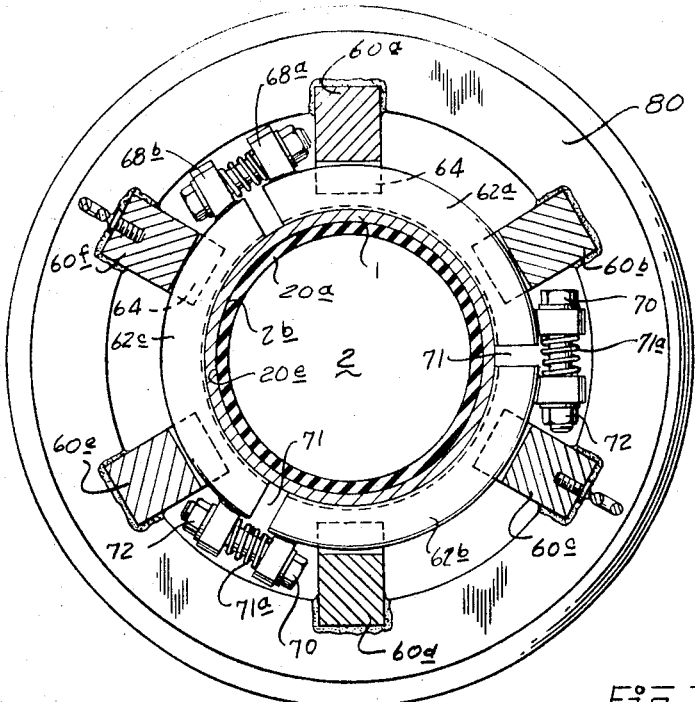
Fig. IV
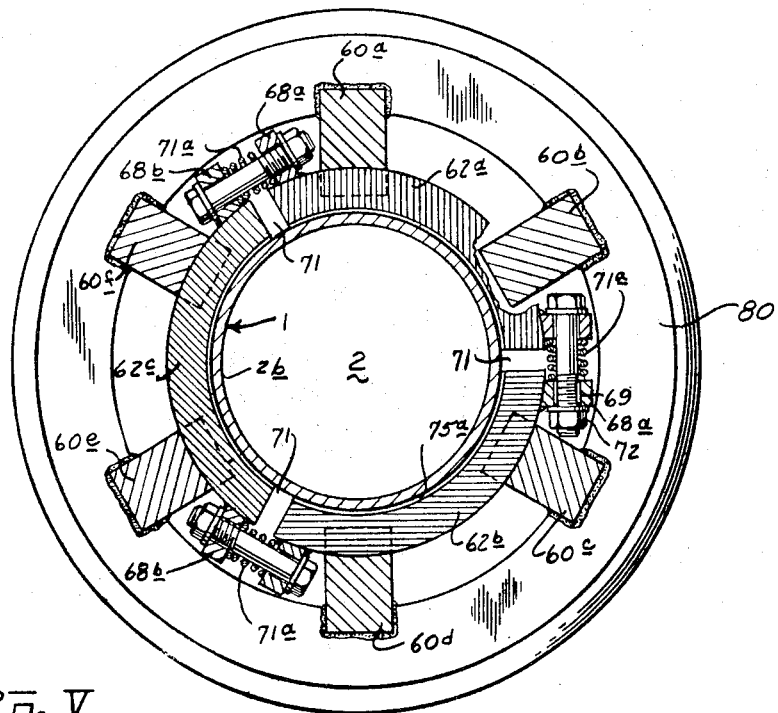
Fig. V

SEALING APPARATUS

CROSS REFERENCE TO RELATED APPLICATIONS

This is a continuation-in-part of my copending Pat. application Ser. No. 22, filed January 2, 1969, entitled "Closure for Pressure Vessels" which was a continuation-in-part of Patent Application Ser. No. 729,966, filed May 17, 1968, entitled "CLOSURE FOR PRESSURE VESSELS," now U.S. Pat. No. 3,498,493 which is a continuation-in-part of Patent Application Ser. No. 494,061, filed Oct. 8, 1965, entitled "CLOSURE SEAL", now U.S. Pat. No. 3,387,738.

BACKGROUND OF INVENTION

The apparatus disclosed in the aforementioned applications offers significant improvements over sealing apparatus heretofore developed. The apparatus disclosed therein generally relates to a seal ring made of resilient material having an outer lip and inwardly extending flange angularly disposed with reference to the outer lip such that the seal ring, which is slidably disposed in a receptacle having an annular skirt, may be positioned about an opening. Fluid pressure exerted through the opening urges the flange of the seal ring downwardly to seal about the opening, while urging the annular lip outwardly to seal against the skirt of the receptacle.

Pressure vessels, such as tanks and pipe lines for storing and transporting liquids and gases under pressure must meet certain standards, as specified by regulatory authorities and users as to internal pressure as to which they can be subject without rupturing or leaking, inasmuch as many of the liquids and gases stored and transported therein are of volatile, noxious, flamable, and explosive character. Such internal pressure tests, often made in pressure ranges to double the desired working pressure of the vessel, must be carried out by the manufacturer as a safety precaution, to comply with the rules of regulatory authorities and to meet the requirements of carriers and users.

Prior to development of the invention described in the aforementioned patents, difficulty had been encountered in carrying out such testing operations due to the difficulty of properly sealing the opening or openings in the tank, pipe, or other container during such testing operations and in carrying out inspection tests to see that the prescribed standards were maintained after installation.

The apparatus disclosed in the aforementioned patents is very effective for sealing openings in pressure vessels, such as tanks and pipes. The apparatus employs a differential area principle wherein the area of a sealing element against which pressure in the vessel acts is less than the area of the sealing element upon which pressure in a receptacle secured to the vessel acts. Since equal fluid pressure acts upon each of the surfaces, the sealing element is urged by the pressure into sealing engagement with the vessel.

However, since the sealing element employed to seal the end of a pipe was urged against end surfaces of the pipe, pipe having rough ends was difficult to seal and sometimes damaged the sealing element.

The problems encountered in carrying out periodic inspection of pressure vessels are so similar to those encountered in testing that the description will be directed primarily to testing operations. However, it should be noted that the use of the embodiments of the closure and seal hereinafter described is not restricted to testing operations.

SUMMARY OF INVENTION

I have developed an improved sealing apparatus for pressure vessels comprising the combination of a seal ring receptacle and a seal ring assembly slidably disposed therein. A sealing element on the seal ring is adapted to extend through an opening into a pressure vessel and is expanded by fluid pressure into sealing engagement with inner surfaces of the vessel.

The seal ring assembly comprises an annular stiffener or retainer ring, having an annular shoulder on the outer periphery thereof, allowing the retainer ring to wobble or tilt relative to the receptacle in which it is slidably disposed. A resilient piston, or seal ring, is secured to the retainer ring, said seal ring having an annular lip adapted to be urged into sealing relation with the inside walls of the skirt of the receptacle in which the retainer ring and piston are slidably disposed. The retainer ring also has a resilient sealing element secured thereto, in spaced apart relation from the seal ring, said sealing element being adapted to be urged by fluid pressure into sealing relation with inner surfaces of the pressure vessel about the opening to be sealed while the retainer ring is urged into sealing relation with outer surfaces of the vessel about the opening.

A plurality of anchor members, having downwardly converging surfaces on lower portions thereof, are disposed in sliding relation with slip ring segments having complementary inclined surfaces such that forces exerted through the anchor members longitudinally of a portion of the vessel are translated into transverse forces urging the slip ring segments into frictional engagement with the outer walls of the vessel. The surfaces of the slip ring which are in engagement with the outer walls of the conduit have a high coefficient of static friction.

A primary object of the present invention is to provide an improved closure for pressure vessels wherein a seal is urged against both inner and outer surfaces about an opening in a pressure vessel, or other container, wherein the seal is actuated and uniformly applied by injecting pressure into the pressure vessel, container or conduit to positively close the opening, and wherein the greater the injected the pressure, the tighter the seal is applied.

Another object of the invention is to provide an improved closure for pressure vessels which provides means for sealing about an opening having rough irregular surfaces thereabout in a pressure vessel which may be easily and quickly applied over and about the opening, and which may be easily and quickly removed therefrom.

Another object of the invention is to provide an improved closure for pressure vessels which provides means for sealing over and about an opening in a pressure vessel to be tested which is adaptable and conformable to different types of openings, for example, openings through an extension or standpipe secured about the opening of a tank or openings through the wall of a pressure vessel.

Still another object of the invention is to provide an improved closure for pressure vessels in which the seal has lower surfaces conformable to inner and outer surfaces of the vessel about the opnning.

A still further object of the invention is to provide an improved closure for pressure vessels adapted to grippingly engage the walls of pressure vessel to detachably secure the closure relative to the vessel.

Other and further objects of my invention will become apparent from the detailed description hereinafter following and the drawings annexed hereto.

DESCRIPTION OF THE DRAWING

Drawings of a preferred embodiment of the invention are annexed hereto so that the invention may be better and more fully understood, in which:

FIG. I is a plan view of the closure apparatus;

FIG. II is a cross-sectional view taken substantially along line II—II of FIG. I;

FIG. III is a cross-sectional view taken substantially along line III—III of FIG. II;

FIG. IV is a cross-sectional view taken substantially along line IV—IV of FIG. II;

FIG. V is a cross-sectional view taken substantially along line V—V of FIG. II;

FIG. VI is a fragmentary perspective view of a seal element;

FIG. VII is a cross-sectional view taken along line VII—VII of FIG. I; and

FIG. VIII is a fragmentary perspective view of a modified form of the seal ring.

Numeral references are employed to designate like parts throughout the various figures of the drawings.

DESCRIPTION OF A PREFERRED EMBODIMENT

Referring to FIGS. I and II of the drawing, the numeral 1 designates an inlet connection of a pressure vessel, pipe, conduit, tubular member, or other container, having a passage 2 formed therein.

Such inlet connection is normally provided on pressure vessels used for storing and dispensing liquefied petroleum gas, such as butane or propane, and sometimes includes an annular flange (not shown) about the upper end thereof through which are provided spaced stud receiving holes for attachment to a corresponding flange on a control head (not shown) mounted above same. Such control head normally provides a mounting for dispensing outlet, control valves, a pressure gauge, safety valve and other control devices normally required for connecting with such equipment. Other connections besides a control head could be attached to the inlet connection 1 such as a conduit having a corresponding connector thereon.

It will be understood that such type of inlet connection is merely for illustration purposes and that the invention described and claimed herein can be employed with different types and shapes of tank outlets.

The closure apparatus, generally designated by the numeral 4, is positioned to engage and seal against the surface 6 of inlet connection 1 around passage 2 which extends therethrough.

A dome-shaped cover 8 forms a receptacle having a passage 9 in the upper side thereof which is normally closed by a suitable plug 9a. The passage 9 provides an opening for bleeding or flushing air out of the tank or conduit before it is closed for testing. After the pressure vessel is thus flushed out the plug may be secured in the passage 9 to provide a leak-proof closure during the testing operation. A suitable source of pressurized fluid may be connected through a pipe 10 and passage 9b with the passage 2 if it is deemed expedient to do so for delivering pressurized fluid thereinto.

The dome-like cover 8 includes an annular downwardly extending skirt portion 8a which has formed on its inner side an annular recess 21 for receiving the seal ring assembly 16. Preferably the inner surface 21a of the recess 21 is machined and finished to provide a smooth surface for receiving the seal hereinafter described.

Furthermore, it will be noted that the width of recess 21 is greater than the width of flange 18 of seal assembly 16 and greater in width than the shoulder 24 on the outer periphery of stiffener or retainer ring 12, hereinafter more specifically described, so that the seal assembly 16 can move up and down to act as a piston in response to variations of pressure within the dome 8.

Seal ring assembly 16 comprises a stiffener ring 12, a resilient piston or seal ring 14 carried by the stiffener ring 12; seal means, such as gasket 19 carried by stiffener ring 12; and a sealing element 20.

Stiffener ring 12 is preferably of rigid construction and has a recess 22 formed in a lower portion thereof arranged to form a shoulder 24 around the periphery of stiffener ring 12.

Stiffener ring 12 has passages 26 extending therethrough, said passages forming a fluid connection between the passage 2 in inlet connection 1 and the inside of dome shaped cover 8 above piston assembly 16.

The central portion 28 of stiffener ring 12 has an opening 30 formed therein through which suitable means, such as stem 40, to urge the seal ring assembly toward the end surface 6 on inlet connection 1 may be connected as hereinafter more fully explained.

The resilient piston or seal ring 14 is preferably made of resilient material, such as neoprene or rubber compound, and includes an upwardly extending annular lip 17 and flange 18 being preferably, but not necessarily, disposed in right angular relationship with reference to the outer surface 17a. The flange 18 is secured to stiffener ring 12 to provide reinforcement to prevent undue extrusion of resilient material into passage 2 of inlet connection 1 and through any openings which may be formed in or around the surfac 6 against which seal assembly 16 is urged. The seal ring 14 might also be made of flexible, relatively pliable metal or other material which would provide a seal, such as aluminum, asbestos composition, Teflon, and the like.

To facilitate accomplishing a seal between the end surface 6 on inlet connection 1 and seal ring assembly 16, seal means, such as gasket 19 is secured to stiffener ring 12. The degree of resiliency and thickness of the gasket 19 is, to some extent, dependent upon the size, shape, and roughness of surface 6 of inlet connection 1. If the end of connection 1 is smooth and relatively flat, gasket 19 is preferably constructed of resilient material. However, if the end is rough or has sharp edges, gasket 19 is preferably constructed of a harder less resilient metallic material.

The sealing element 20, best illustrated in FIGS. II and VI, is particularly adapted to extend into the opening 2 in inlet connection 1 such that fluid pressure urges same into sealing engagement with inner surfaces 2b of the connection.

The outer lip 20a of element 20 preferably has a tapered cross-section arranged to form a sharp lower edge 20b which can be readily deflected to facilitate insertion thereof into opening 2. The tapered lip 20a, constructed of resilient material such as neoprene or rubber, is pliable and urged into intimate contact with surface 2b inside the inlet opening 2 even at low fluid pressure, for example as pressure is increasing while fluid is being injected.

To accomplish an initial seal when pressure inside and outside connection 1 are substantially equal, the circumference of the periphery of element 20 adjacent the edge 20b is preferably slightly greater than the inside diameter of opening 2. The circumference of the element 20 adjacent the opposite end 20c thereof is substantially equal to that of the opening 2. It should be appreciated that the outer surface 20d, therefore, resembles that of a truncated chonical member and that when lip 20a is positioned in opening 2, the edge 20b is biased into engagement with the surface 2b.

Sealing element 20 preferably is not rigidly connected to stiffener ring 12 because it is generally desirable to position element 20 as illustrated in FIG. II prior to securing the receptacle 4 to inlet connection 1. Therefore, a second tapered lip 20d on element 20 is arranged to seal against the face of stiffener ring 12. Lip 20d extends arcuately inwardly about the end 20c of element 20 and the edge 20e is biased into sealing relation with the face of stiffener ring 12 before seal ring assembly reaches the position illustrated in FIG. II.

In the particular embodiment of the device illustrated the gasket 19 is bonded to sealing element 20. However, it should be appreciated that if gasket 19 is to be constructed of resilient material the gasket 19 and element 20 can be formed as a single element by molding or extrusion processes. It also should be readily apparent that lip 20a and lip 20d can be separate elements so long as the required sealing is accomplished.

In the embodiment of the invention illustrated in FIG. II of the drawing, the resilient piston 14 is secured to stiffener ring 12 by threaded bolts 31 which extend through apertures in back-up member 32 and through apertures in flange 18 of seal ring 14 to threadedly engage threaded holes in stiffener ring 12.

A modified form of the seal ring is illustrated in FIG. VIII wherein a stiffener ring 112 has an annular groove 113 formed about the upper periphery thereof to receive the ring 114. Seal ring 114 has tapered outer lips 117 urged by fluid pressure into sealing relation with the inner surface 21a of the skirt 8a of receptacle 4 and into sealing relation with side 113a of groove 113. A shoulder 113b extends about groove 113 limiting movement of ring 114 relative to stiffener ring 112 in an axial direction. A recess 122 is formed about the lower portion of stiffener ring 112, as viewed in FIG. VIII, providing a guiding surface or shoulder 124 to permit alignment of stiffener ring 112 with the end surface of pipe 1.

A conventional bonnet 34 extends through and is rigidly connected to, a central portion of dome 8. Bonnet 34 has a threaded bore 36 threadedly engaging threads 38 on the rising stem 40. Stem 40 has a hand wheel 42 at the upper end thereof whereby rotation of the hand wheel 42 rotates stem 40 thereby moving said stem axially relative to dome 8.

Suitable packing material 44 is disposed about stem 40 to prevent leakage therearound.

Stem 40 has a reduced portion 46 at the lower end thereof which extends through opening 30. Washers 48 and 50 are positioned on opposite sides of the central portion 28 of stiffener ring 12 and are secured on the lower end of stem 40 by a nut 54 which threadedly engages the end of stem 40. It will be noted that a space 46a is provided between washers 48 and 50 and transversely extending central portion 28, allowing seal ring assembly 16 to move and float vertically toward and away from surface 6 on inlet connection 1. When pressure is applied within passage 2 of inlet connection 1, the seal ring assembly 16 acts like a piston and moves toward surface 6 to form a positive seal thereagainst.

Stem 40 facilitates positioning seal ring assembly 16 and prevents it from falling out while cover 8 is being placed over passage 2, while the cap 4 is being transported, or while it is in storage.

Stiffener ring 12, having a tapered or relieved recess portion 22 forming a shoulder 24 adjacent the upper edge thereof, allows stiffener ring 12 and seal ring 14 to float freely to conform to the configuration of the surface 6 of inlet connection 1, thereby preventing sticking or wedging in the event seal ring assembly 16 is tilted out of a plane perpendicular to the axis of the passage 2.

Recess 22 also compensates for slight deformation of retainer ring 12 when high pressure is applied thereto.

The outer surface 17a of lip 17 is preferably flat and closely conforms to the inner surface 21a of the recess 21 provided on the inner side of skirt 8a of cover 8.

Suitable means for securing the dome-shaped cover 8 to the inlet connection 1 of a pressure vessel comprises means, such as anchor members 60 and slip ring segments 62, for translating force exerted against the cover 8, tending to move said cover away from the surface 6 of inlet connection 1, into a force directed transversely of the longitudinal axis of the inlet connection 1 to grippingly engage the outer surface of the inlet connection 1.

In the particular embodiment of the invention illustrated in the drawing, anchor members 60 comprise legs 60a, 60b, 60c, 60d, 60e and 60f spaced equidistantly about the periphery of receptacle 8. Preferably there should be at least three such spaced legs welded or otherwise secured to cover 8 to provide uniform sealing about the passage 2. However, such seal could be provided by two or more such legs spaced thereabouts and in the illustrated embodiment six legs are employed.

Each leg 60a–60f is secured to the skirt 8a of cover 8 and extends downwardly therefrom. The lower end of each of said legs is turned inwardly at its lower end to provide a hook-like member 64.

As best illustrated in FIG. II of the drawing, hook portions 64 on the lower ends of legs 60a–60f have shaped, tapered, downwardly converging surfaces 66 formed thereon.

Slip ring assembly 62 is preferably formed in segments 62a, 62b, and 62c.

Each of the segments 62a, 62b, and 62c has outwardly extending lugs 68a and 68b welded or otherwise secured to opposite ends thereof, each of said lugs having an aperture 69 extending therethrough. The slip ring segments are secured together by connectors such as bolts 70 which extend through apertures 69 in lugs 68a and 68b on the respective segments.

As best illustrated in FIGS. IV and V of the drawings, spaces 71 are provided between the ends of the respective segments 62a, 62b and 62c such that tightening of nuts 72 on threaded bolts 70 urges the segments into gripping engagement with the outer surface of inlet connection 1. It should be noted that connectors 70 do not restrict movement of ring segments 62a, 62b, and 62c inwardly. However, springs 71a are positioned about bolts 70 to bias the segments toward a position wherein the segments disengage inlet connection 1 to maintain the segments in a stationary condition while cover 4 is being positioned over opening 2.

Each of the segments 62a, 62b, and 62c has an inclined surface 76 on the back side thereof which is disposed in sliding relation with inclined surface 66 on the lower ends of legs 60a–60f. Referring to FIG. II of the drawing, it should be readily apparent that the inclination of surfaces 66 and 76 cause abrasive surfaces 75 on each of the segments 62a, 62b, and 62c to be urged into gripping relation with inlet connection 1 when a force is applied to cover 8, tending to separate said cover from inlet connection 1.

In the embodiment of the invention illustrated, the abrasive surface 75 is rough, having teeth 75a formed therein. However, it should be appreciated that an abrasive lining material (not shown) could be employed in lieu of teeth 75a.

When pressure inside cover 8 exerts a force tending to separate said cover from inlet connection 1 a force equal and opposite to that exerted by legs 60a, 60b and 60c upon slip ring segments 62a, 62b, and 62c is exerted outwardly on legs 60a–60f tending to bend them outwardly. Therefore, to prevent bending of the legs 60a–60f outwardly, suitable means such as ring 80, is provided thereabout to prevent deformation of said legs. Ring 80 is welded or otherwise rigidly secured to the lower ends of legs 60a–60f.

From the foregoing it should be readily apparent that inclined surfaces 66 on legs 60a–60f form a cup or socket having a cross-sectional area which decreases downwardly for receiving a substantially conical shaped slip ring assembly 62.

OPERATION

The operation and function of the device hereinbefore described is as follows:

To connect the closure assembly 4 to the inlet connection 1 of a tubular member, nuts 72 on bolts 70 which secure slip ring segments 62a, 62b, and 62c together are loosened to allow the abrasive surfaces 75 on said slip rings to encircle and engage the outer wall of tubular member 1. Nuts 72 are then tightened.

Hand wheel 42 is then rotated to urge seal ring assembly 16 downwardly into sealing engagement with surface 6 about passage 2 of tubular member 1. This establishes an initial seal and removes slack between inclined surfaces 66 and 76 on legs 60a–60f and slip ring segments 62a, 62b, and 62c, respectively, It will be noted that this operation is quickly, simply, and easily carried out.

The plug 9a is then removed to flush air from the tank after the injected pressure fluid is connected to the inside of tubular member 1. The plug 9 is then replaced and the liquid or gas pressure is applied to the interior of the tank or pressure vessel to test same.

Such injected pressure acts upon the upper surface of seal ring 14 to force flange 18 against the upper surface of stiffener ring 12, sealing therebetween while simultaneously urging stiffener ring 12 and seal means 19 into sealing engagement with outer surface 6 about passage 2 in tubular member 1. The injected pressure also acts upon the inner surface 17b of lip 17 to urge the outer surface 17a of lip 17 into sealing engagement with the inner surface 21a of recess 21 formed in the skirt 8a of the cover 8 to press such surface into sealing engagement. As hereinbefore described lips 20a and 20d of element 2o seal against the face of stiffener ring 12 and the inside wall 2b of tubular member 1.

The greater the pressure applied internally of the pressure vessel 1 the more positive and secure the seal is. It should also be noted that the greater the pressure applied internally of the pressure vessel the more positive the gripping action of seal ring segments 62a, 62b, and 62c. The seal about passage 2 in tubular member 1 in uniformly applied along both the surface 6 and 21a to provide a uniform seal without areas of leakage.

As hereinbefore pointed out, a source of pressurized fluid may be connected through a suitable conduit 10, best illustrated in FIG. II, to deliver pressurized fluid to the inside of closure assembly 4.

It should be readily apparent that other and further embodiments of the invention may be devised without departing from the basic concept of my invention.

Having described my invention I claim:

1. Means for sealing about a passage through a wall of a vessel comprising, a seal ring receptacle, said receptacle having an annular skirt portion; anchor means secured to said receptacle to secure said receptacle relative to the vessel; a piston slidably disposed in the receptacle, said piston having an aperture extending therethrough and having a surface area acted upon by pressure in the receptacle which is greater than the surface area acted upon by fluid in the vessel such that fluid pressure in the receptacle urges said piston toward the wall; a first lip on said piston arranged to be urged by fluid pressure into sealing engagement with an inner surface of the annular skirt portion of the receptacle; and a second lip on said piston positioned to extend through an opening in a vessel when the piston is positioned in engagement therewith and arranged to be urged by fluid pressure into sealing engagement with an inner surface of the vessel.

2. The combination called for in claim 1 wherein the anchor means has tapered surfaces thereon; and with the addition of slip ring segments positionable about a portion of the vessel, said segments having tapered surfaces thereon slidably engageable with the tapered surfaces on the anchor means.

3. The combination called for in claim 1 with the addition of means between the receptacle and the piston to urge the piston toward a surface about the passage.

4. The combination called for in claim 3 wherein the means to urge the piston toward a surface about the passage comprises a stem movable through an aperture in the receptacle; and with the addition of means to secure the stem to the piston.

5. The combination called for in claim 1 wherein the piston comprises an annular stiffener ring made of non-resilient material and having an annular recessed area about one end thereof, providing an outwardly extending shoulder about the other end thereof; a resilient seal ring carried by the stiffener ring, said resilient piston including an upwardly projected annular lip substantially co-extensive with the outer surface of the shoulder.

6. The combination called for in claim 5 wherein the resilient seal ring is mounted on the inner end of the stiffener ring.

7. The combination called for in claim 2 with the addition of abrasive means on the inner side of the slip ring segments engageable with an outer wall of the vessel.

8. The combination called for in claim 7 wherein the abrasive means comprises teeth formed on at least one of the slip ring segments.

9. The combination called for in claim 2 with the addition of means secured to the anchor means to prevent deformation of said anchor members.

10. Means for sealing about a passage in a vessel comprising, a seal ring receptacle, said receptacle having an annular skirt portion; a seal ring assembly slidably disposed in the receptacle, said seal ring assembly having an aperture extending therethrough and having surfaces thereon arranged to be urged into sealing engagement with an inner surface of the skirt portion of the seal ring receptacle and with an outer surface of the vessel; sealing means secured to said seal ring assembly adapted to extend into the passage in the vessel and arranged to be urged into sealing engagement with an inner surface of the vessel; spaced anchor members depending from said skirt portion; inter-engaging gripping means connectable between the anchor members and the vessel arranged to grippingly engage the outer wall of the vessel whereby fluid pressure in the vessel urges the seal ring assembly into sealing engagement relative to the outer wall of the vessel about the passage and with the skirt of the receptacle, urges the sealing means into sealing engagement with the inner wall of the vessel, and causes the interengaging means to grip the outer wall of the vessel.

11. An article of manufacture comprising, an annular stiffener ring; an annular shoulder on the outer periphery of the stiffener ring; a first resilient annular lip secured to the stiffener ring, said resilient lip projecting outwardly from one side of said ring adjacent said shoulder; and a second resilient annular lip secured to an opposite side of said ring and axially aligned with said first lip.

12. The combination called for in claim 11 with the addition of resilient seal means on the stiffener ring circumferentially disposed about said second annular lip.

13. The combination called for in claim 12 wherein the seal means is a gasket.

14. The combination called for in claim 11 wherein the stiffener ring has an opening extending through a central portion thereof.

15. Means for closing an opening in a pressure vessel comprising, a segmented slip ring assembly positionable to frictionally engage a portion of the pressure vessel; seal means positionable adjacent the opening in the pressure vessel, said seal means having a passage extending therethrough; a receptacle positionable about the seal ring assembly; and anchor means secured relative to the receptacle and engageable with the slip ring assembly such that internal fluid pressure in the pressure vessel urges the seal ring assembly into sealing engagement with inner surfaces of the pressure vessel around the opening therein, and simultaneously urges the receptacle away from the pressure vessel to cause the slip ring assembly to frictionally engage a portion of the pressure vessel.

16. The combination called for in claim 15 with the addition of resilient means secured to said slip ring assembly arranged to bias surfaces thereon out of frictional engagement with the vessel.

17. The combination called for in claim 16 wherein the slip ring assembly comprises a plurality of ring segments having ends secured together; and wherein the resilient means is positioned to urge adjacent ends of the ring segments in opposite directions.

* * * * *